(12) United States Patent
Neal et al.

(10) Patent No.: US 7,047,590 B2
(45) Date of Patent: May 23, 2006

(54) COMBINATION BARBECUE GRILL CARE TOOL

(75) Inventors: Ryan Neal, Midland, GA (US); Kenneth Jordan, Columbus, GA (US)

(73) Assignee: W. C. Bradley Company, Columbus, GA (US)

( * ) Notice: Subject to any disclaimer, the term of this patent is extended or adjusted under 35 U.S.C. 154(b) by 346 days.

(21) Appl. No.: 10/212,393

(22) Filed: Aug. 5, 2002

(65) Prior Publication Data

US 2004/0019991 A1    Feb. 5, 2004

(51) Int. Cl.
    *A47L 13/02*    (2006.01)
(52) U.S. Cl. ......................... 15/111; 15/114; 15/236.01; 15/236.05; 15/236.06; 15/236.07
(58) Field of Classification Search ................. 15/111, 15/114, 236.01, 236.05, 236.07, 236.06; D4/118; D32/42, 46

See application file for complete search history.

(56) References Cited

U.S. PATENT DOCUMENTS

| | | | | |
|---|---|---|---|---|
| 5,263,222 A | * | 11/1993 | Johnstone, II | 15/236.02 |
| 5,373,600 A | * | 12/1994 | Stojanovski et al. | 15/111 |
| 6,018,836 A | * | 2/2000 | Williams | 15/111 |
| 6,216,306 B1 | * | 4/2001 | Esterson et al. | 15/111 |
| 6,443,646 B1 | * | 9/2002 | MacDonald | 401/39 |
| 6,745,428 B1 | * | 6/2004 | MacLean | 15/111 |

* cited by examiner

*Primary Examiner*—Richard Crispino
*Assistant Examiner*—Abraham Bahta
(74) *Attorney, Agent, or Firm*—James W. Kayden; Thomas Kayden, Horstemeyer & Risley LLP

(57) ABSTRACT

A combination grill care tool for cleaning a barbecue grill cooking surface includes a tool head having an upper surface and a lower surface. A handle having a proximal end and a distal end extends from the tool head such that the distal end opposes the tool head. A push-pull scraper disposed on the upper surface of the tool head extends from the tool head. The push-pull scraper has a first blade and a second blade. The first blade and the second blade are adapted to engage and break loose residue on the barbecue grill cooking surface. A method of use is also provided.

15 Claims, 3 Drawing Sheets

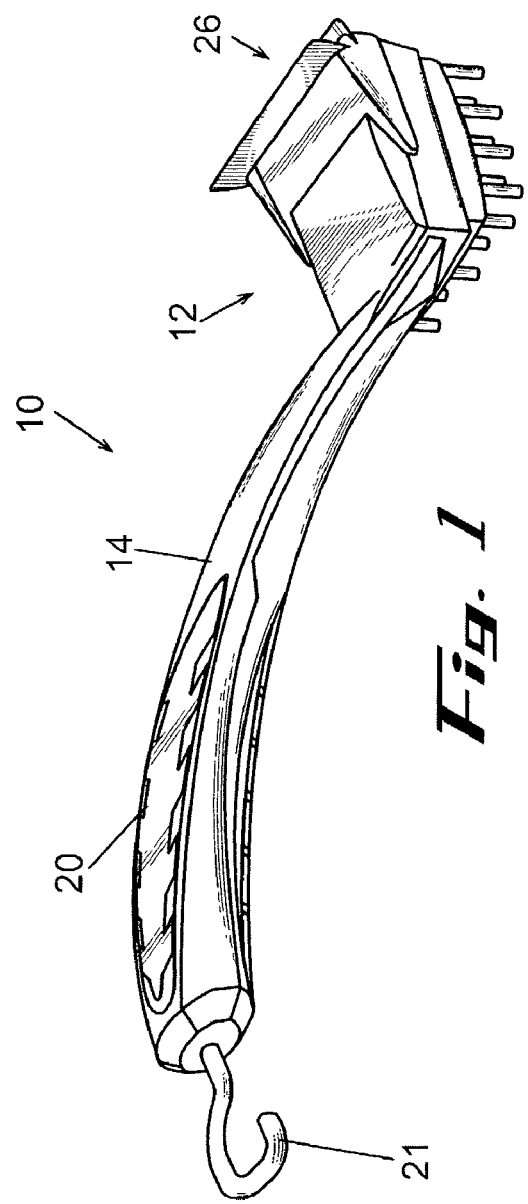
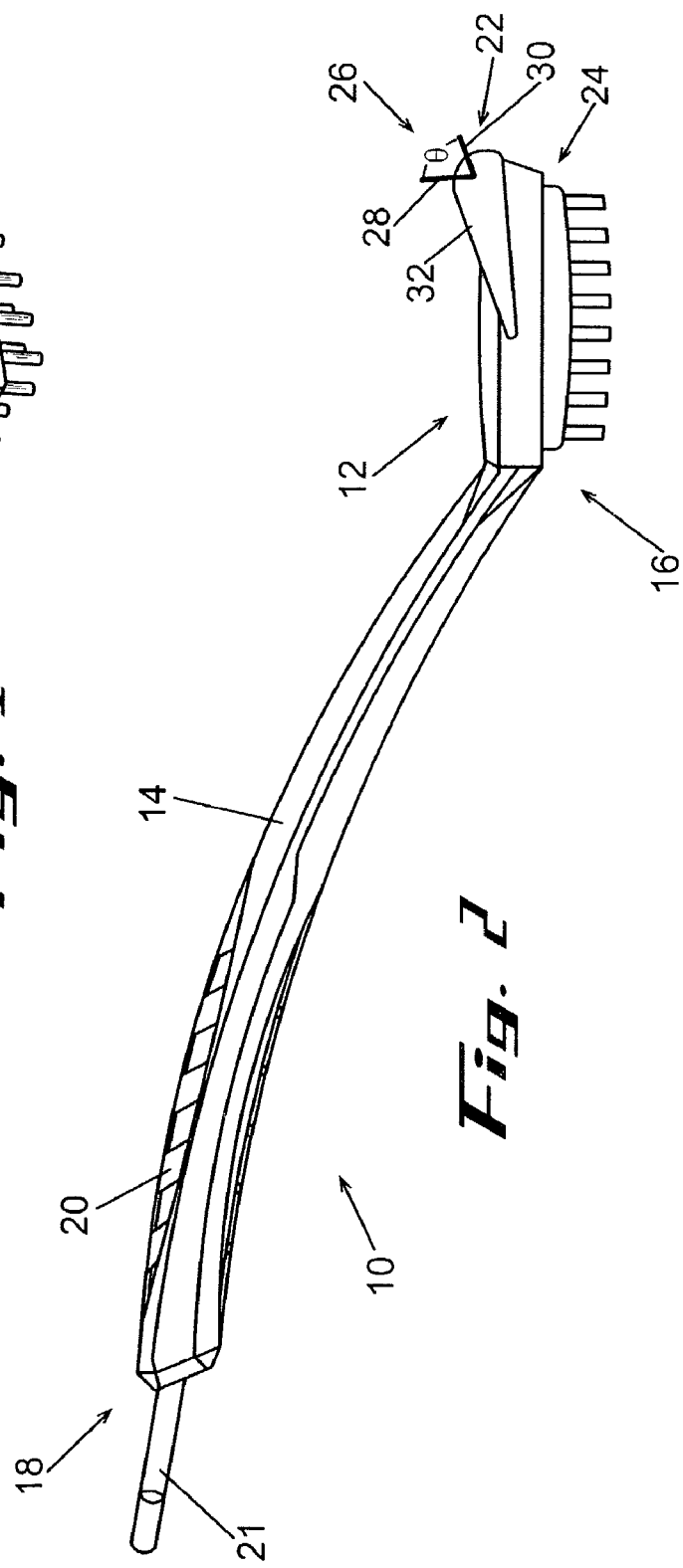

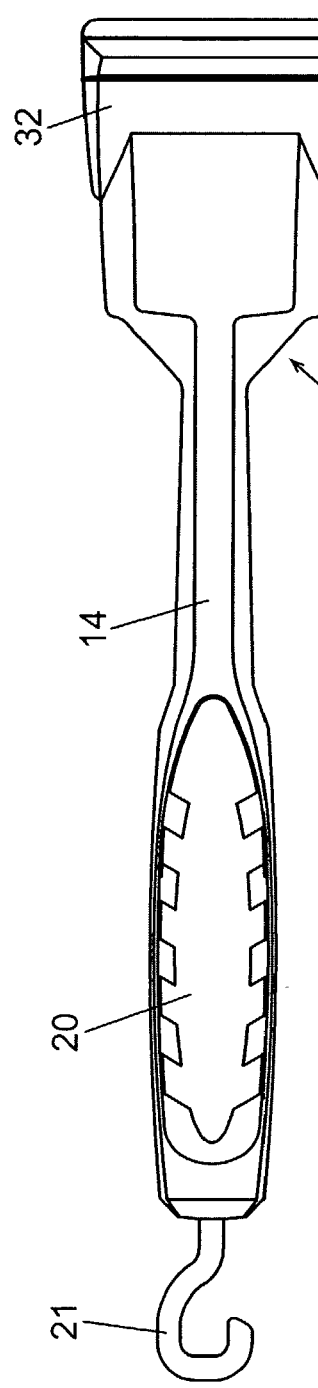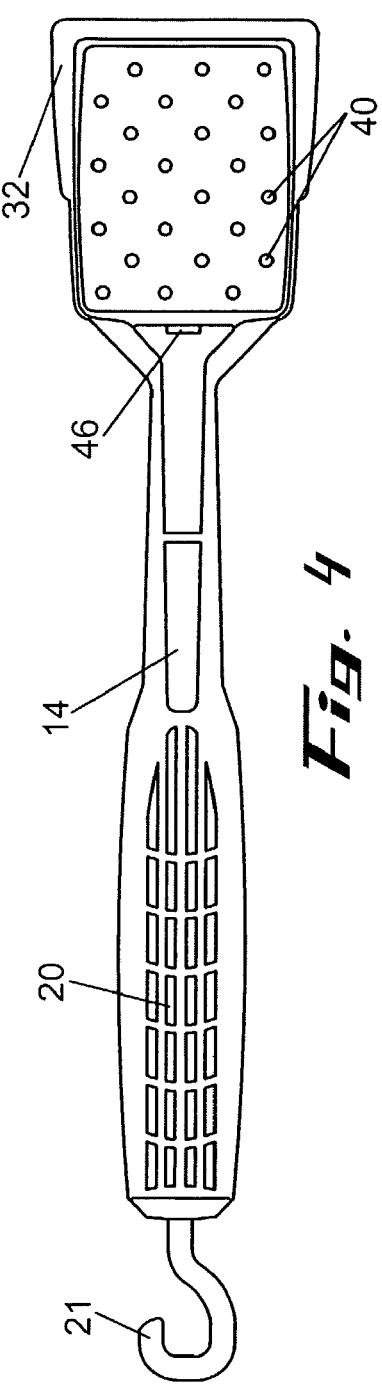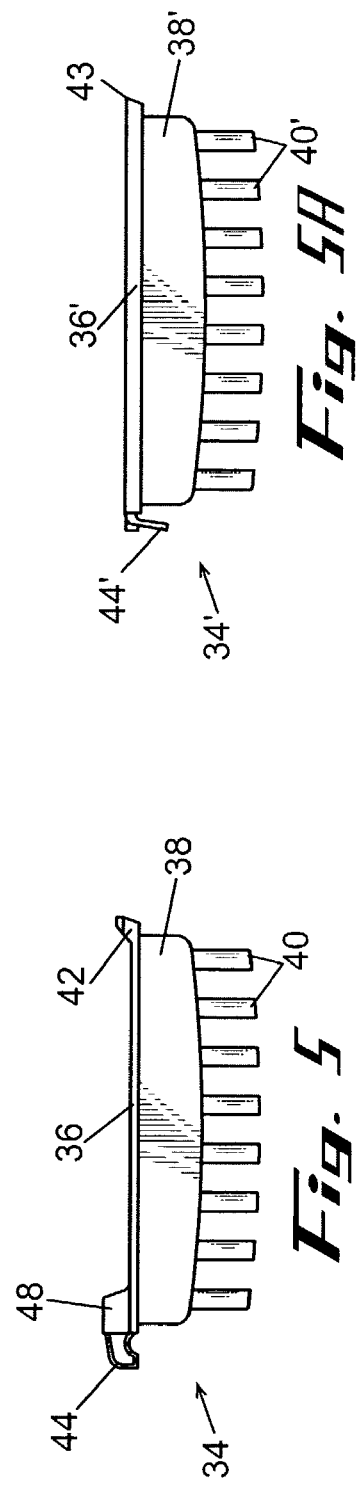

COMBINATION BARBECUE GRILL CARE TOOL

TECHNICAL FIELD

The present invention is generally related to tools for use with barbecue grills and more particularly, is related to a combination grill care tool.

BACKGROUND OF THE INVENTION

Barbecue grills can be used to cook various types of meat, including beef, chicken, fish, pork, etc. A typical barbecue grill comprises a firebox having a cooking surface suspended or supported therein over a source of heat. The cooking surface typically comprises a grate. Grease and remnants from meats cooked on barbecue grills build up on the grate and can be difficult to remove. However, leaving such grease and remnants on the cooking surface during the subsequent preparation of other foods can taint the taste of the foods and could be unhealthy. Such build up can also fuel flame-ups on the cooking surface, which can make cooking difficult or even dangerous for the user. Therefore, removal of the build-up of such matter on the cooking surface is desirable.

Such grease and remnants are typically removed from a grill cooking surface through a combination of scraping the built-up matter off the cooking surface and brushing the loosened matter from the cooking surface. Loosening the matter through scraping at the build-up requires the use of one tool while brushing the loosened matter from the cooking surface requires the use of another tool. Because barbecue grills are often portable and used outdoors, it is desirable to use, maintain, and transport as few tools as possible when using or cleaning a barbecue grill.

Loosening the built-up matter with a scraper can be arduous work. Typically, a tool having one sharp edge is moved along the cooking surface such that the edge of the tool digs into the built-up matter. The edge of such tools typically engages the matter only when the tool is moved in one direction. Therefore, each time the tool is moved in a direction in which the edge does not engage the residue the tool must either be adjusted such that the edge does engage the matter or the stroke is unproductive. Either way, more time and energy is expended than necessary and desirable.

Grease and remnants are typically cooked onto the cooking surface. Therefore, the process of removing stubborn built-up matter can be tough on the tools used for removal of the matter. As such, the ability to replace portions of the tools that bear the brunt of the wear and tear from removing build up matter from the grill cooking surface is desirable for many reasons.

Thus, a heretofore unaddressed need exists in the industry to address the aforementioned deficiencies and inadequacies.

SUMMARY OF THE INVENTION

Preferred embodiments of the present invention provide a combination grill care tool for cleaning a barbecue grill cooking surface and a method for use. Briefly described, in architecture, one embodiment of the apparatus can be implemented as follows. A combination grill care tool for cleaning a barbecue grill cooking surface comprises a tool head having an upper surface and a lower surface. A handle having a proximal end and a distal end extends from the tool head such that the distal end opposes the tool head. A push-pull scraper disposed on the upper surface of the tool head extends from the tool head. The push-pull scraper has a first blade and a second blade. The first blade and the second blade are adapted to engage and break loose residue on a barbecue grill cooking surface upon moving the push-pull scraper in a backward and forward motion along the cooking surface. At least one of the first blade and the second blade engages a portion of the barbecue grill cooking surface during both the backward motion and the forward motion along the cooking surface.

Preferred embodiments of the present invention can also be viewed as providing a method of use of a combination grill tool for cleaning a barbecue grill cooking surface. In this regard, one embodiment of such a method, among others, can be broadly summarized by the following steps: gripping a handle of a combination grill care tool; engaging remnants on a grill cooking surface with a push-pull scraper; moving the push-pull scraper along the grill cooking surface; and removing the loosened remnants from the grill cooking surface by engaging a portion of a scrubbing pad of the grill care tool.

Other systems, method, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1 illustrates a perspective view of a combination barbecue grill care tool of the present invention.

FIG. 2 is a side view of the combination barbecue grill care tool illustrated in FIG. 1.

FIG. 3 is a top view of the combination barbecue grill care tool illustrated in FIG. 1.

FIG. 4 is a bottom view of the combination barbecue grill care tool illustrated in FIG. 1.

FIG. 5 is a side view of an embodiment of a brush pad of the combination barbecue grill care tool illustrated in FIG. 1.

FIG. 5A is a side view of another embodiment of a brush pad of the combination barbecue grill care tool illustrated in FIG. 1.

DETAILED DESCRIPTION OF THE PREFERRED EMBODIMENTS

Figure 6:
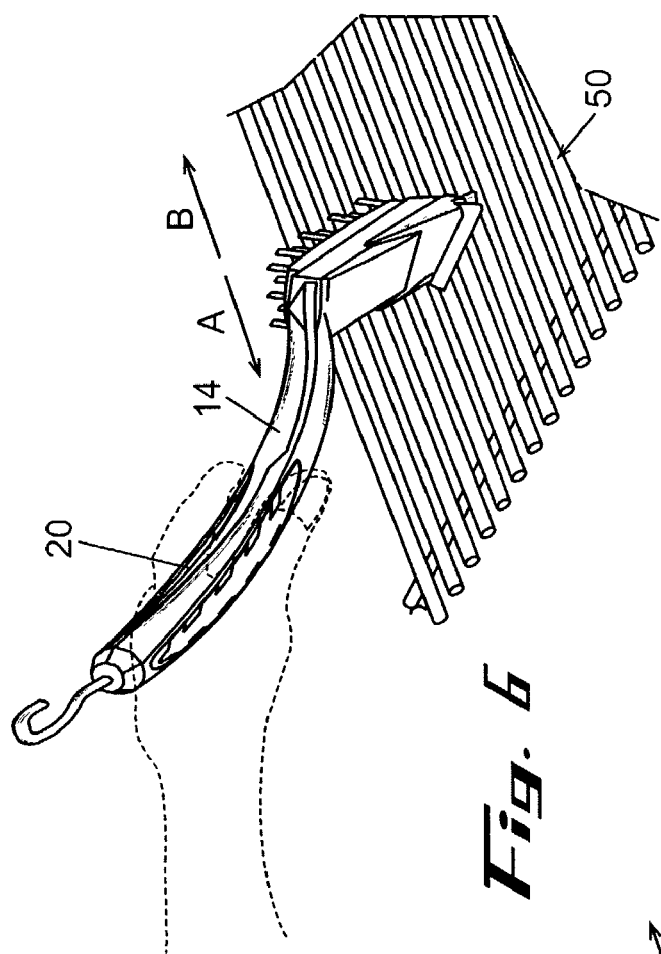
FIG. 6 is a perspective view of an embodiment of a method of use of the combination barbecue grill care tool illustrated in FIG. 1.

FIG. 1 illustrates one preferred embodiment of a combination barbecue grill care tool 10 of the present invention. The tool 10 comprises a tool head 12 having a handle 14 extending therefrom. The handle 14 is substantially elongated and defined by a proximal end 16 and a distal end 18. The handle 14 is substantially arcuate in shape and preferably comprises a substantially rigid material, such as a hard plastic, hard rubber, or any suitable material.

A grip surface 20 is disposed on the handle 14 intermediate the proximal end 16 and the distal end 18. The grip surface 20 can be disposed the entire length of the handle 14 or along a portion of the length. The grip surface 20 can also be disposed around a portion of the circumference of the handle 14 or around the entire circumference of the handle 14. The grip surface 20 can comprise a texturing etched or carved into the surface of the handle 14, or comprise a coating of a malleable rubber, soft plastic material, etc., disposed on the surface of the handle 14. The grip 20 preferably comprises any suitable structure or material for enhancing the grip of a human hand around the handle 14.

A hanger 21 is disposed toward the distal end 18 of the handle 14. The hanger 21 can be any suitable shape adapted to engage a portion of a cooking grate, a hook, a nail, or any member from which the grill care tool 10 can be suspended, such as when the tool 10 is not in use. It should be noted that although the hanger 21 is illustrated as having a substantially hook shape configuration, the hanger 21 can comprise any suitable shape for suspending the grill care tool 10. For example, an aperture disposed through a portion of the handle 14 can comprise the hanger 21. Hanger 21 is also designed and provided for lifting the cooking grate and/or replacing it if necessary before, during, or after use of the grill. The hanger may also be used to scrape the underside of the cooking grate while it is in place on the grill by placing the tip through the grate and using the inner edge of the hanger to scrape the bars, wires, etc.

The tool head 12 is disposed toward the proximal end 16 of the handle 14. The tool head 12 is substantially rectangular in shape and defined by an upper surface 22 and a lower surface 24. It should be understood that although the tool head 12 is illustrated as being substantially rectangular, the tool head 12 can comprise any suitable shape.

A push-pull scraper 26 is disposed on the upper surface 22 of the tool head 12. The push-pull scraper 26 comprises a first blade 28 and a second blade 30. Each of the first blade 28 and the second blade 30 includes a sharpened edge disposed in generally opposing relation to the tool head 12. The edge may be smooth, serrated or include an irregular surface such as, for example, barbs, to aid in cleaning a cooking grate. The first blade 28 and the second blade 30 are oriented in a V-shaped configuration. It is preferable that the first blade 28 extends further from the upper surface 22 of the tool head 12 than the second blade 30. It should be noted that although the angle θ between the first blade 28 and the second blade 30 is illustrated as being less than 90 degrees, the angle θ can comprise any suitable angle. It is preferable that the length of the first blade 28 and length of the second blade 30 of the push-pull scraper 26 as well as the angle θ disposed therebetween are selected such that at least a portion of the push-pull scraper 26 is adapted to engage a portion of a barbecue grill cooking surface during both a forward movement of the push-pull scraper 26 along a barbecue grill surface as well as a backward movement. The first blade 28 and the second blade 30 are preferably substantially rigid and comprise a substantially robust material such as stainless steel.

A scraper support 32 is disposed on and extends from the upper surface 22 of the tool head 12. It is preferable that the scraper support 32 extends upward and outward from the tool head 12 opposing the handle 14. The push-pull scraper 26 is preferably disposed toward an outermost edge of the scraper support 32. The scraper support 32 can comprise a hard rubber, rigid plastic, or any suitable material that preferably resists rusting and provides a substantially solid support for the push-pull scraper 26.

A brush pad 34 can be disposed on the lower surface 24 of the tool head 12. More specifically, FIGS. 5 and 5A illustrate embodiments of the brush pad 34. Generally, the brush pad 34 comprises a mounting surface 36 having a scrubbing pad 38 disposed thereon. A portion of the mounting surface 36 opposing the scrubbing pad 38 is adapted to substantially correspond to the lower surface 24 of the tool head 12. The scrubbing pad 38 has a plurality of bristles 40 extending therefrom and opposing the mounting surface 36. It is preferable that the bristles 40 comprise a substantially rigid and durable material having preferably at least some flexibility. The bristles 40 are preferably resistant to rust and therefore comprise a material such as stainless steel, or the like. It should be noted that any suitable number of bristles 40 can extend from the scrubbing pad 38 in any suitable configuration. The brush pad 34 is preferably readily removed from and engaged with the tool head 12. It is preferable that an old or used brush pad 34 can be removed from the tool head 12 and replaced with a new brush pad 34. More specifically, the brush pad 34 includes a means for releasably fastening the brush pad 34 to the tool head 12.

In one embodiment, illustrated in FIG. 5, the mounting surface 36 of the brush pad 34 comprises a locking tab 42 and a pad release 44. The locking tab 42 comprises a lip that extends from the mounting surface 36 outwardly and upwardly, away from the scrubbing pad 38. The locking tab 42 is adapted to releasably engage a channel or aperture (not shown) disposed in the lower surface 24 of the tool head 12.

The pad release 44 extends from the mounting surface 36 of the brush pad 34 and is adapted to releasably engage a pad release receiver 46 (FIG. 4) disposed in the tool head 12. The pad release 44 extends from a pad release tab 48. The pad release tab 48 extends from the mounting surface 36 of the brush pad 34. The pad release 44 is preferably movable laterally into and out of the pad release tab 48.

During installation of the brush pad 34 onto the tool head 12, the locking tab 42 is engaged with a channel on the tool head 12. The pad release 44 is depressed into the pad release tab 48. The pad release tab 48 is inserted through the pad release receiver 46 and the pad release 44 is allowed to expand out of the pad release tab 48 such that the pad release 44 engages a portion of the tool head 12 surrounding the pad release receiver 46. For removal of the brush pad 34 from the tool head 12, the pad release 44 is depressed into the pad release tab 48. The pad release tab 48 is then passed through the pad release receiver 46 of the tool head 12. The locking tab 42 is disengaged from the lower surface 24 of the tool head 12, and the brush pad 34 is removed from the tool head 12. The removed brush pad 34 can be replaced with another brush pad 34.

Referring next to FIG. 5A, another embodiment of the brush pad 34' is illustrated. The brush pad 34' comprises a mounting surface 36' having a scrubbing pad 38' disposed thereon. The mounting surface 36' opposing the scrubbing pad 38' substantially corresponds to the lower surface 24 of the tool head 12. A plurality of bristles 40' extends from the scrubbing pad 38' opposing the mounting surface 36'. The mounting surface 36' comprises a means for fastening the brush pad 34' to the tool head 12. One such means comprises a locking edge 43 and a pad release 44'. The locking edge 43 comprises an angled portion adapted to substantially correspond to a portion of the tool head 12. The pad release 44' is adapted to releasably engage the pad release receiver 46 (FIG. 4) of the tool head 12.

During installation of the brush pad 34' onto the tool head 12, the locking edge 43 is engaged with a portion of the tool head 12 adapted to receive the locking edge 43. Engagement of the locking edge 43 with a portion of the tool head 12 discourages movement of the brush pad 34' with respect to the tool head 12 during installation. The pad release 44' is urged toward the mounting surface 36' and scrubbing pad 38'. The pad release 44' is inserted through the pad release receiver 46 of the tool head 12. The pad release 44' is released and moves away from the mounting surface 36' and scrubbing pad 38' such that the pad release 44' engages a portion of the tool head 12 surrounding the pad release receiver 46. Alternatively, the pad release 44' can be urged through the pad release receiver 46 such that the pad release receiver 46 forces the pad release 44' toward the mounting surface 36' and scrubbing pad 38'. Once the pad release 44' passes through the pad release receiver 46 the pad release 44' snaps back into position. For removal of the brush pad 34' from the tool head 12, the pad release 44' is urged toward the mounting surface 36' and scrubbing pad 38'. The pad release 44' is passed back through the pad release receiver 46 of the tool head 12. The locking edge 43 is disengaged from the lower surface 24 of the tool head 12, and the brush pad 34' is removed from the tool head 12.

Turning next to FIG. 6, one method of use of the combination barbecue grill care tool 10 is illustrated. A user grips the handle 14 intermediate the proximal end 16 and the distal end 18. Where the optional grip surface 20 is included on the handle 14, the user may grip the handle 14 at the grip surface 20. The user orients the tool 10 such that the push-pull scraper 26 is substantially adjacent a portion of the grill cooking surface 50 that the user desires to clean. It is preferable that the first blade 28 and the second blade 30 of the push-pull scraper 26 both engage the cooking surface 50 while the tool 10 is held in one position. The tool 10 is alternatingly moved by the user in direction A and direction B. The first blade 28 and the second blade 30 may be adapted such that one of the first blade 28 or the second blade 30 is more effective when moved in one of direction A or direction B, and the other of the first blade 28 or the second blade 30 is more effective when moved in the other of direction A or direction B. During movement in both direction A and direction B, the first blade 28 and the second blade 30 are preferably engaging and loosening remnants disposed on the cooking surface 50. The user can repeat movement of the tool 10 in direction A and direction B, alternatingly, as desired. After the push-pull scraper 26 has been used to loosen built-up remnants on the cooking surface 50, the bristles 40 of the brush pad 34 can be used to brush away those loosened remnants.

Figure 7:
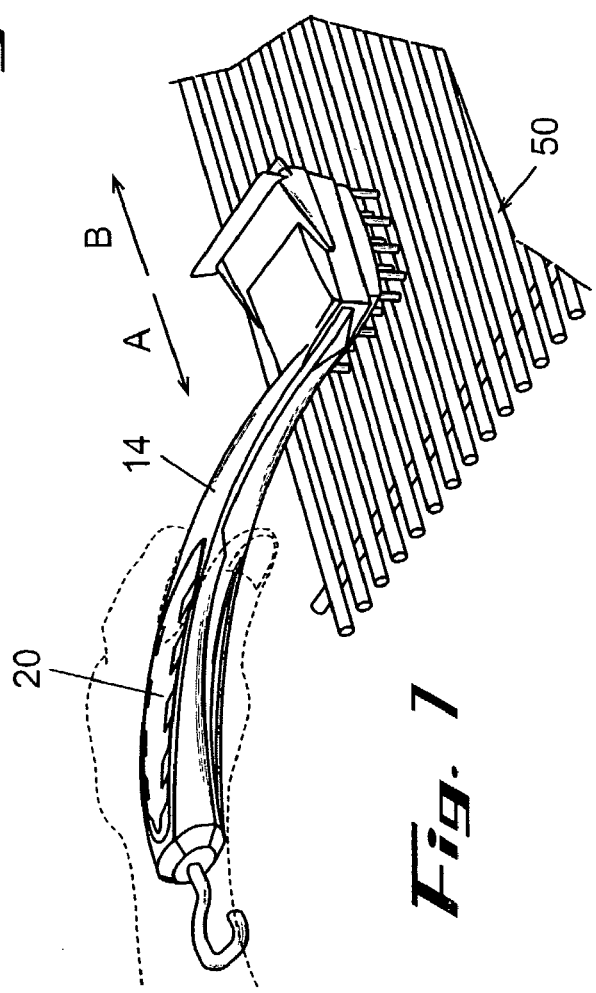
FIG. 7 is a perspective view of another embodiment of a method of use of the combination barbecue grill care tool illustrated in FIG. 1.

As shown in FIG. 7, the user rotates the tool 10 about an axis running along the length of the handle 14 approximately 180° to orient the tool 10 such that the bristles 40 are substantially adjacent the grill cooking surface 50. The bristles 40 engage the grill cooking surface 50 and the tool 10 is moved along the grill cooking surface 50 in direction A and direction B, alternatingly, or in any desired direction. After the grill cooking surface 50 is cleaned as desired, the tool 10 can be stored by hanging the tool 10 from the hanger 21. The brush pad 34 can be removed from the tool head 12 as necessary, and as described hereinabove. It should be noted that although usage of the tool 10 is described herein as applying the push-pull scraper 26 to the grill cooking surface 50 followed by applying the bristles 40 to the grill cooking surface 50, the tool 10 can be used in any desired manner without departing from the spirit of the invention.

It should be emphasized that the above-described embodiments of the present invention, particularly, an "preferred" embodiments, are merely possible examples of implementations, merely set forth for a clear understanding of the principles of the invention. Many variations and modifications may be made to the above-described embodiments(s) of the invention without department substantially from the spirit and principles of the invention. All such modifications and variations are intended to be included herein within the scope of this disclosure and the present invention and protected by the following claims.

Therefore, having thus described the invention, at least the following is claimed:

1. A combination grill care tool for cleaning a barbecue grill cooking surface comprising:
    a tool head having an upper surface opposing a lower surface;
    a handle having a proximal end and a distal end, and extending from said tool head such that said distal end opposes said tool head;
    a push-pull scraper disposed on said upper surface of said tool head and extending therefrom, said push-pull scraper having a first blade and a second blade, said first blade and said second blade being adapted to engage and break loose residue on the barbecue grill cooking surface upon moving said push-pull scraper in a backward motion and a forward motion along the cooking surface;
    a cleaning tool configured to releasably secure to said tool head; and
    a push-pull scraper support disposed on said upper surface of said tool head, wherein at least a portion of said push-pull scraper support is disposed between said first blade and said second blade,
    wherein the lower surface is configured to releasably secure said cleaning tool to said tool head,
    wherein at least one of said first blade and said second blade engages a portion of the barbecue grill cooking surface during both said backward motion and said forward motion along the cooking surface,
    wherein said first blade and said second blade extend different lengths from said tool head, and
    wherein said first blade and said second blade are arranged having a predetermined angle disposed therebetween.

2. The combination grill care tool of claim 1, further comprising:
    a push-pull scraper support disposed on said upper surface of said tool head, said push-pull scraper support being disposed opposing said handle and being adapted to fixedly support said push-pull scraper.

3. The combination grill care tool of claim 1 wherein said cleaning tool comprises:
    a brush pad having bristles extending therefrom, said brush pad further comprising a locking tab and a pad release, said locking tab and said pad release being adapted to be releasably engaged by said tool head.

4. The combination grill care tool of claim 3, further comprising:
    a pad release receiver disposed in said tool head, said pad release receiver being adapted to releasably engage said pad release of said brush pad.

5. The combination grill care tool of claim 3, wherein said bristles of said brush pad comprise a substantially rigid material.

6. The combination grill care tool of claim 1, further comprising:
  a hanger being disposed toward said distal end of said handle, wherein said hanger is adapted to support the tool in a hanging configuration and engage a portion of the barbecue grill cooking surface.

7. The combination grill care tool of claim 1, wherein said first blade and said second blade of said push-pull scraper comprises a substantially V-shaped configuration.

8. The combination grill care tool of claim 1, wherein said first scraper blade is a different length than said second scraper blade.

9. A combination grill care tool for cleaning a barbecue grill cooking surface comprising:
  a handle having a proximal end, a distal end, and an upper surface;
  a scraping means disposed at said proximal end of said handle, said scraping means including a first blade and a second blade, said scraping means being adapted to engage a portion of a grill cooking surface during movement in a backward direction and movement in a forward direction; and
  a tool support disposed on said upper surface and extending in an upward direction from said upper surface, said tool support being adapted to fixedly support said scraping means,
  wherein said first blade and said second blade extend different lengths from said scraping means,
  wherein said first blade and said second blade are arranged having a predetermined angle disposed therebetween, and
  wherein at least a portion of said tool support is disposed between said first blade and said second blade.

10. The combination grill care tool of claim 9, further comprising:
  a brush pad fastening means; and
  a brush pad fixed to said tool support by said brush pad fastening means.

11. The combination grill care tool of claim 9, further comprising:
  means for hanging the grill care tool, said means for hanging being disposed on said handle.

12. A combination grill care tool for cleaning a barbecue grill cooking surface comprising:
  a tool head having an upper surface and a lower surface;
  a handle having a proximal end and a distal end, said handle extending from said tool head such that said distal end opposes said tool head;
  a push-pull scraper disposed on said upper surface of said tool head and extending therefrom, said push-pull scraper including a first blade and a second blade, said push-pull scraper being adapted to engage and break loose residue on a barbecue grill cooking surface upon moving said push-pull scraper in a backward motion and in a forward motion along the cooking surface; and
  a scraper support disposed on said upper surface of said tool head and extending in an upward direction from said upper surface of said handle, said scraper support being disposed opposing said handle and being adapted to fixedly support said push-pull scraper,
  wherein said tool head is adapted to releasably receive an interchangeable brush pad,
  wherein said first blade and said second blade are arranged having a predetermined angle disposed therebetween, and
  wherein at least a portion of said scraper support is disposed between said first blade and said second blade.

13. The combination grill care tool of claim 12, further comprising:
  an interchangeable brush pad releasably fixed to said tool head.

14. The combination grill care tool of claim 13, wherein said interchangeable brush pad further comprises:
  a mounting surface having a portion adapted to substantially correspond to said lower surface of said tool head;
  a brush pad disposed on said mounting surface; and
  a means for releasably fixing said interchangeable brush pad to said tool head.

15. The combination grill care tool of claim 14, wherein said interchangeable brush pad further comprises:
  a plurality of bristles extending from said brush pad.

* * * * *